United States Patent
Wingate et al.

[11] Patent Number: 6,085,870
[45] Date of Patent: Jul. 11, 2000

[54] LUBRICANT TRANSFER CONNECTION

[75] Inventors: Mark Anthony Wingate, Rochester; Glenn Alan Guaraldi, Kingston, both of N.H.

[73] Assignee: Heidelberger Druckmaschinen AG, Heidelberg, Germany

[21] Appl. No.: 09/042,163

[22] Filed: Mar. 13, 1998

[51] Int. Cl.[7] .................................................. F01M 1/00
[52] U.S. Cl. .......................... 184/6.8; 184/7.1; 277/307; 277/407; 285/121.5
[58] Field of Search .................... 184/6.8, 7.1, 46, 184/60, 105.3, 109; 285/121.5; 277/377, 407, 408, 650, 944

[56] References Cited

U.S. PATENT DOCUMENTS

| | | | |
|---|---|---|---|
| 2,141,404 | 12/1938 | Penick et al. ............................. | 285/22 |
| 2,412,287 | 12/1946 | Phillips ................................... | 285/97.3 |
| 2,447,509 | 8/1948 | Kocher . | |
| 2,458,343 | 1/1949 | Carleton ................................. | 285/97.3 |
| 2,736,265 | 2/1956 | Higgins .................................. | 103/103 |
| 3,051,498 | 8/1962 | Porges .................................... | 277/93 |
| 3,957,291 | 5/1976 | Edling et al. . | |

FOREIGN PATENT DOCUMENTS

| | | |
|---|---|---|
| 0 758 729 | 2/1997 | European Pat. Off. . |
| 73 37578 | 5/1975 | France . |
| 195 23 721 | 8/1996 | Germany . |

*Primary Examiner*—David M. Fenstermacher
*Attorney, Agent, or Firm*—Kenyon & Kenyon

[57] ABSTRACT

A lubricant transfer connection for transferring lubricant from a lubricant transfer line which feeds into a lubricant supply bore machined in a bearing support housing. A lubricant transfer bushing is located at the moving interface between the lubricant supply bore machined in the bearing support housing and a lubricant input port in a cam follower lever arm. The lubricant transfer bushing is designed so that it provides a movable, sealed, connection between the lubricant channel in the bearing support housing and the lubricant input port in the cam follower lever arm, in all positions of the cam follower and cam follower lever arm. A lubricant passage through the lubricant transfer bearing is sized and positioned sufficiently to allow it to provide a passageway between the lubricant channel in the bearing support housing and the lubricant input port in the cam follower lever arm in any angular position of the cam follower lever arm, but the overlap of the passages is not excessive, so that the lubricant channel and the lubricant input port are not exposed to the atmosphere to cause leaks. The lubricant input port in the cam follower lever arm leads to passages in the cam follower lever arm and the cam follower, which transfer lubricating lubricant from the lubricant input port to the cam follower without leakage.

9 Claims, 5 Drawing Sheets

LUBRICANT TRANSFER CONNECTION

BACKGROUND OF THE INVENTION

1. Field of the Invention

The present invention relates to a connection for transferring lubricant across a moving interface between parts. In particular, the present invention relates to a lubricant transfer bushing for transferring lubricating grease between a lubricant line in a cylinder body of a high-speed combination folder for a printing press and a cam follower movable relative to the cylinder body.

2. Description of the Prior Art

In high-speed combination folders used with printing presses, it is known—as shown in FIG. 7—to provide a cylinder 100, a shaft 15 and a cam follower 1 which is mounted for pivoting movement relative to the shaft 15. Cylinder 100 rotates in direction D. As is known in the prior art, these cam followers 1 experience high loads and high rotational speeds; as a result, the follower must be lubricated for proper operation. Prior art folders have used two methods for lubricating the cam follower: sealed cam followers and relubricatable cam followers.

Sealed cam followers use a lubricant—typically, grease—which is sealed within the cam follower and not replenished during operation. A disadvantage of sealed cam followers is that if the lubrication heats up sufficiently to liquefy (i.e., at temperatures roughly greater than 70° C.), it may flow past the seals, thereby decreasing the amount of lubrication and potentially resulting in seizing of the cam follower.

Because of the above-described disadvantages of the use of sealed cam followers, certain prior art cam followers 1 (as shown in FIG. 7) have been manufactured to be relubricatable. A typical prior art relubricatable cam follower 1 arrangement includes lubricant supply lines 102 which are connected, via flexible plastic tubing 101 spanning the dynamic interface between moving parts (i.e., between supply housing 22 and cam follower lever arm 5), to a lubricant inlet port in the cam follower lever arm 5. The lubricant inlet port is connected to internal lubricant channeling holes or grooves in the cam follower lever arm 5 and the cam follower 1, which act to transfer the lubricant from the lubricant inlet port to the cam follower 1, thereby providing a continuous source of lubricant to the cam follower 1.

SUMMARY OF THE INVENTION

In the prior art cam follower arrangements, there is movement between the cylinder body and the cam follower lever arm. The presence of a moving interface between these parts creates difficulty in supplying lubricant in a way which crosses this moving interface. It has been found that one disadvantage of prior art relubricatable cam followers is that the flexible plastic tubing connecting the lubricant supply line to the lubricant inlet port, which flexible tubing is used to cross the moving interface, has a finite life and may be exposed to stationary parts when rotating which can snag the flexible plastic tubing. As a result, the flexible plastic tubing is subject to breakage, leakage, or disconnection.

The present invention is a lubricant transfer connection which eliminates the disadvantages of prior art lubricant transfer arrangements using flexible plastic tubes. In the present invention, the lubricant transfer line feeds into a lubricant supply bore machined in the bearing support housings mounted on the cylinder. A lubricant transfer bushing is located at the moving interface between the lubricant supply bore machined in the bearing support housing and a lubricant input port in the cam follower lever arm. The lubricant transfer bushing is designed so that it provides a movable, sealed, connection between the lubricant channel in the bearing support housing and the lubricant input port in the cam follower lever arm, in all positions of the cam follower and cam follower lever arm. The lubricant transfer bushing may be made of a material, such as Delrin®, which has a low coefficient of friction yet has high wear-resistance. The lubricant transfer bushing may be sealingly mounted against the bearing support housing or the cam follower arm using a suitable set screw, spring, or other securing mechanism. A lubricant passage through the lubricant transfer bushing is sized sufficiently to allow it to provide a passageway between the lubricant supply bore in the bearing support housing and the lubricant input port in the cam follower lever arm in any angular position of the cam follower lever arm. The lubricant input port in the cam follower lever arm leads to passages in the cam follower lever arm, an eccentric stud and the cam follower, which transfer lubricating lubricant from the lubricant input port to the cam follower without leakage. The cam follower lever arm may include a partial cutout which allows the eccentric stud to be angularly adjusted relative to the cam follower lever arm without interruption of the lubricant passage to the cam follower bearing races.

BRIEF DESCRIPTION OF THE DRAWINGS

The foregoing and other features of the present invention will become apparent to those skilled in the art to which the present invention relates from reading the following description with reference to the accompanying drawings, in which.

DETAILED DESCRIPTION OF THE INVENTION

Figure 1:
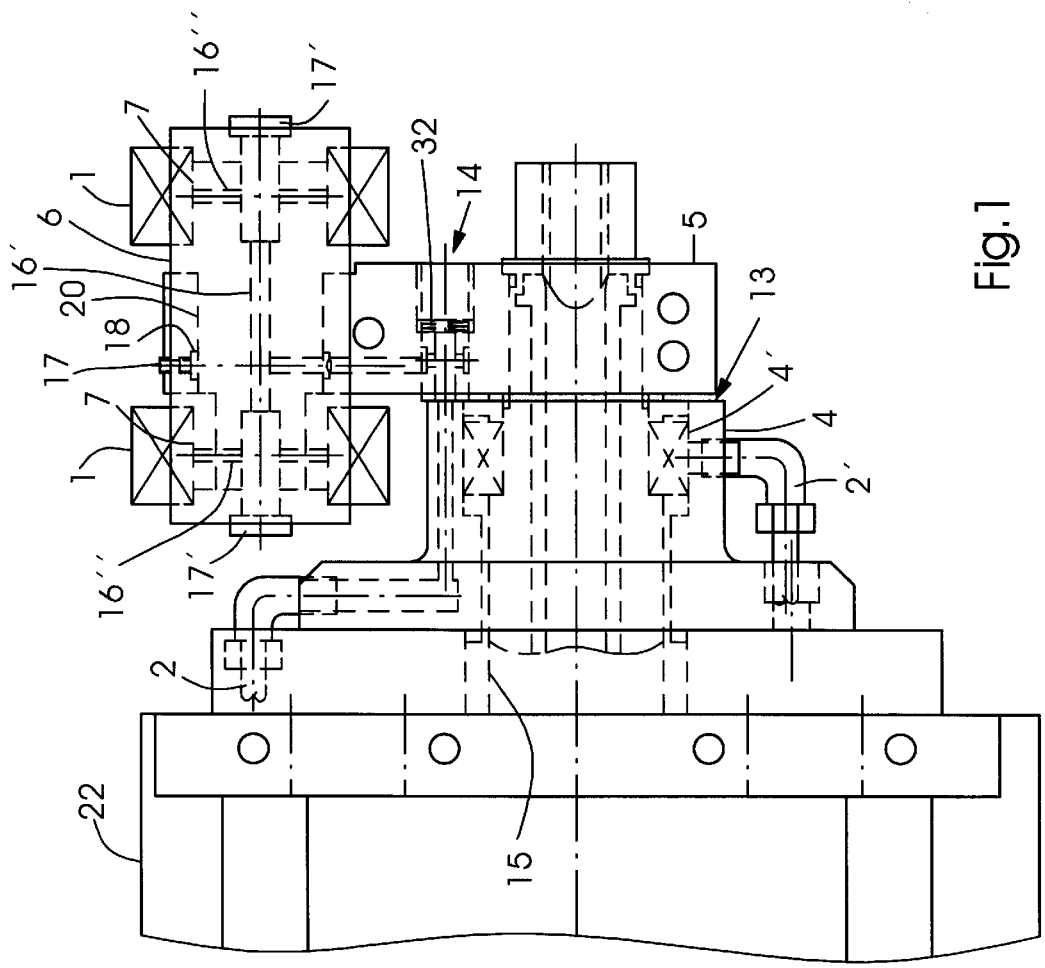
FIG. 1 is a side view of a cylinder, a cam follower, and lubricant transfer connection of one embodiment of the present invention.
Figure 7:
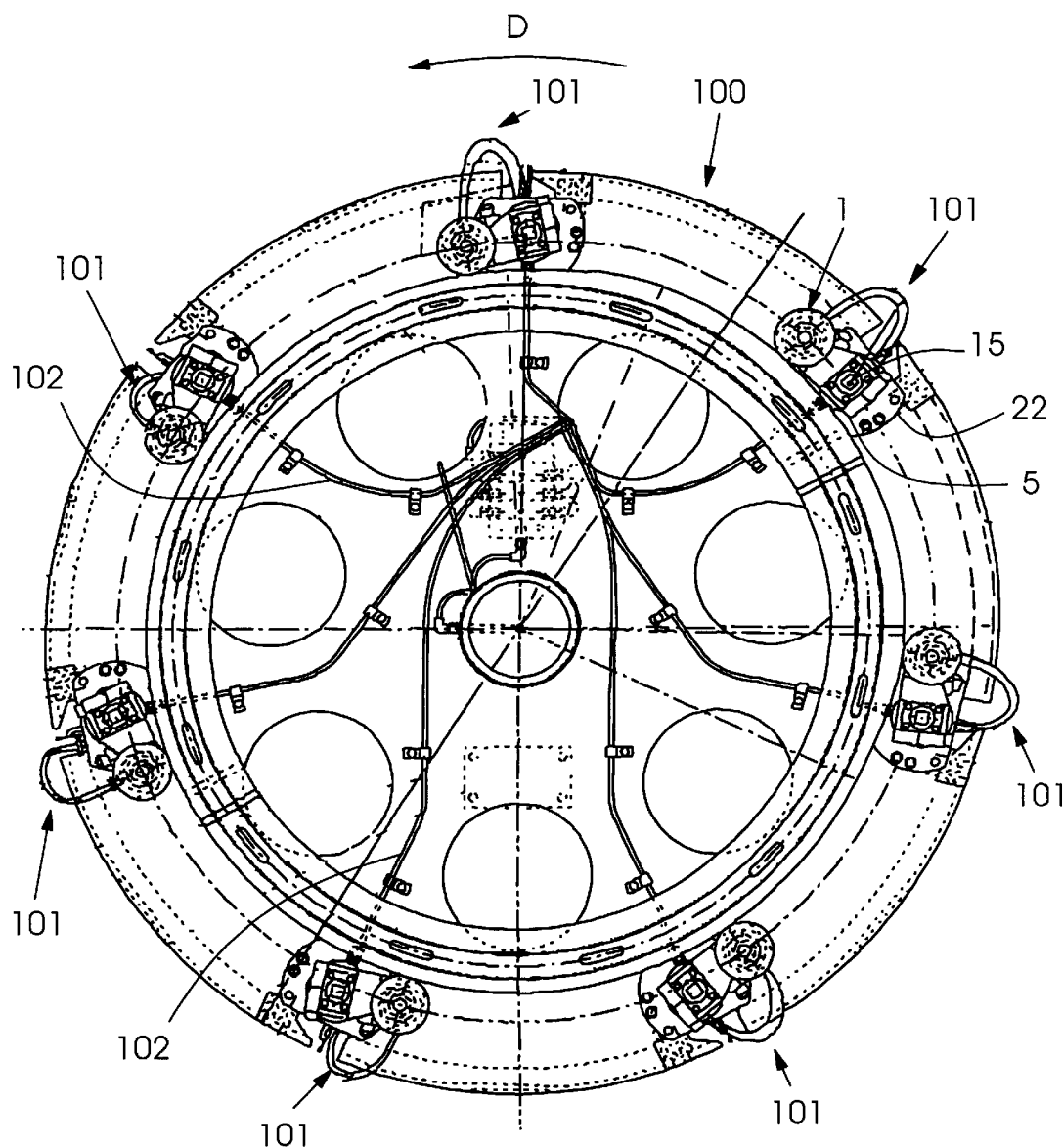
FIG. 7 is an elevation view of a cam follower lubrication system of the prior art.

As shown in FIG. 1, on a cylinder for a high-speed combination folder is mounted a gripper shaft or tucking blade shaft 15. As shown in FIG. 7, there can be several such shafts mounted on one cylinder. A bearing support housing 4 is mounted around gripper shaft or tucking blade shaft 15, and includes a lubricant supply bore 12 which is connected at one end to a lubricant supply line 2. Bearing support housing 4 also includes a smooth and/or polished support 13 on one end.

A cam follower lever arm 5 is mounted for pivoting movement relative to bearing support housing 4. Mounted on one end of cam follower lever arm 5 is and eccentric stud 20, upon which are mounted one or more cam followers 1.

Inner bearing races 7 allow cam followers 1 to rotate relative to eccentric stud 20. As described in detail below, eccentric stud 20 is adjustably mounted on cam follower lever arm 5.

Figure 2:
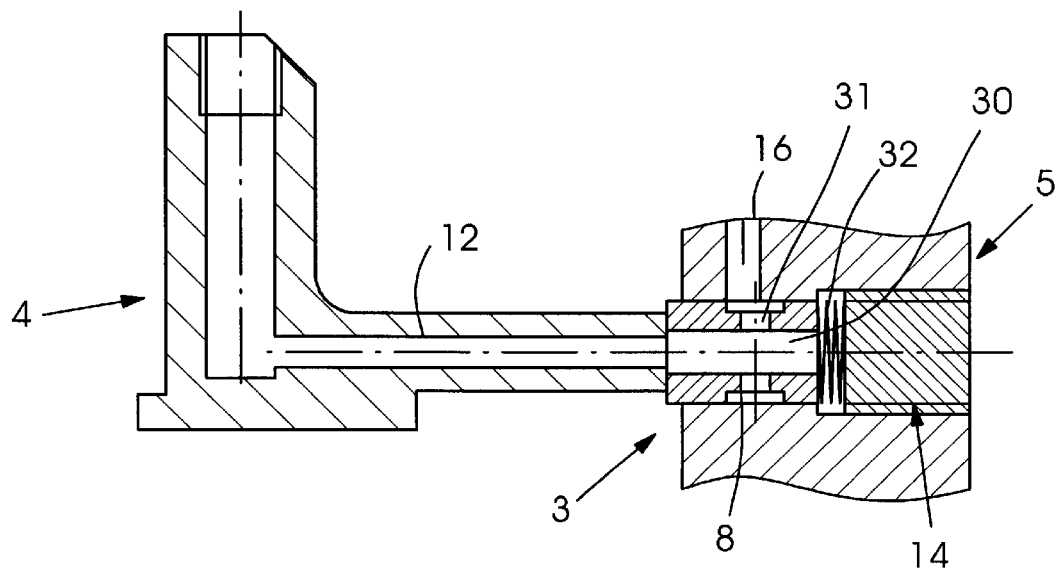
FIG. 2 is a cross-sectional, detail view of the lubricant transfer bushing of the present invention.
Figure 4:
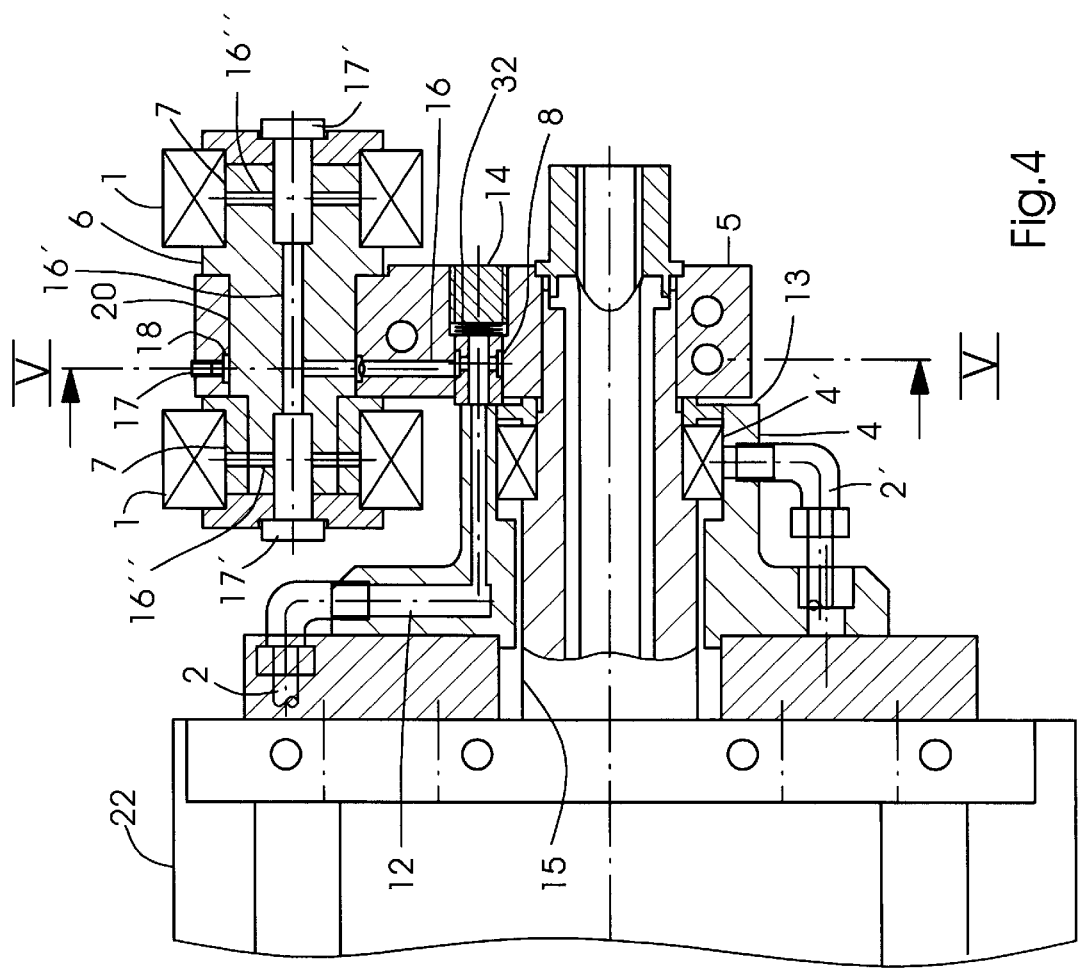
FIG. 4 is a cross-sectional side view of a cylinder, cam follower, and lubricant transfer connection of the embodiment of FIG. 1.

FIGS. 2 and 4 are cross-sectional views showing details of the lubricant transfer connection of the present invention. Lubricant, e.g., grease, is fed into lubricant supply bore 12 from lubricant supply line 2. An additional lubricant supply line 2' may feed lubricant to a bearing 4' in bearing support housing 4. At the moving/dynamic interface 3 between bearing support housing 4 and a lubricant inlet port in cam follower lever arm 5 is mounted a lubricant transfer bushing 8. Lubricant transfer bushing 8, in the embodiment of FIGS. 2 and 4 includes one end which is mounted against, and in sealing and sliding contact with, the smooth surface 13 of bearing support housing 4. In order to ensure good sealing and sliding contact between the end of lubricant transfer bushing 8 and the smooth surface 13 of bearing support housing 4, lubricant transfer bushing 8 is preferably made of a low friction, high wear resistance material such as DEL-RIN®. Also to ensure that good sealing and sliding contact is made between the end of lubricant transfer bushing 8 and the smooth surface 13 of bearing support housing 4, a set screw 14 may be used to maintain contact between lubricant transfer bushing 8 and smooth surface 13 of bearing support housing 4, and to account for wear. The lubricant transfer bushing 8 will wear as it maintains contact against the smooth surface 13. The set screw 14 can be periodically adjusted to take up any slack in the contact between the lubricant transfer bushing 8 and the smooth surface 13 as the result of wear. As a result, the lubricant supply bushing will operate for a period of time in a state of zero clearance with the smooth surface 13—i.e., neither wearing nor leaking. As shown in FIGS. 2 and 4, a compression spring 32 can be placed between set screw 14 and lubricant transfer bushing 8 in order to bias the lubricant transfer bushing 8 against the smooth surface 13. Lubricant transfer bushing 8 has a lubricant passage formed by both an axial bore 30, which aligns with lubricant supply bore 12, and a transverse bore 31, which aligns with a cam follower lever arm transfer bore 16. The lubricant transfer bushing 8 also includes a groove around its outer surface, at transverse bore 31, to ensure lubricant transfer. Lubricant transfer bushing 8 thereby acts to transfer lubricant from lubricant supply bore 12 to cam follower lever arm transfer bore 16, via axial bore 30 and transverse groove and bore 31.

Figure 3:
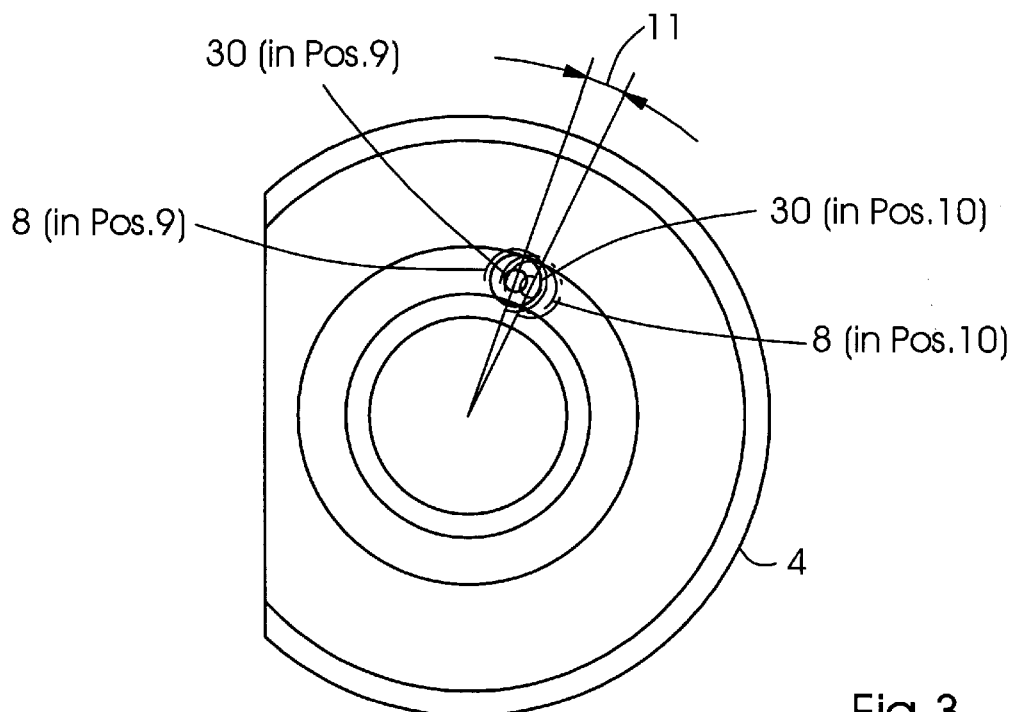
FIG. 3 is a schematic end view of the lubricant transfer bushing of the present invention in two different angular positions.
Figure 6:
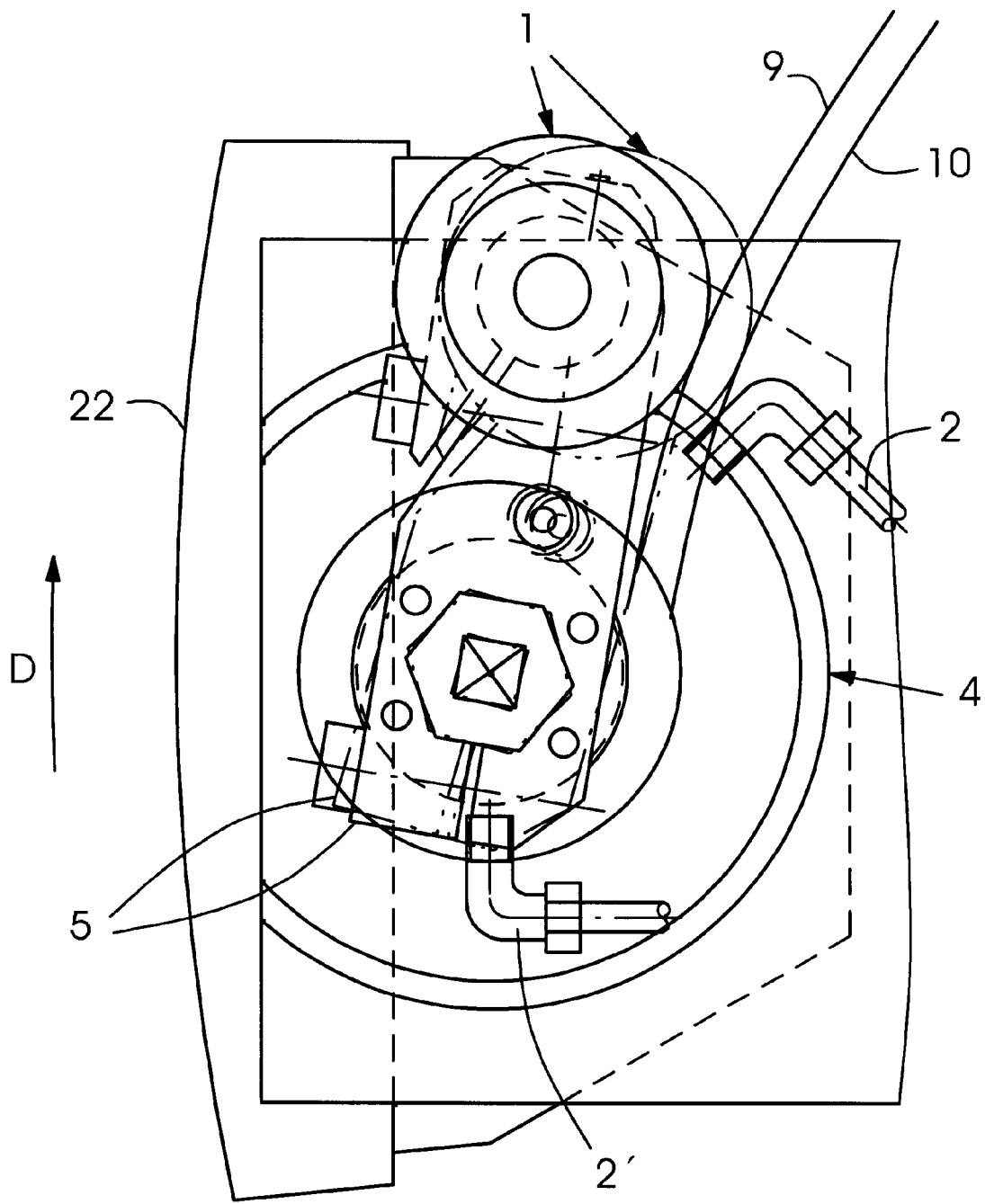
FIG. 6 is an end view of the cam follower and cam follower lever arm, showing high-dwell and low-dwell position.

As may be seen in particular in FIG. 6, cam follower lever arm 5 pivots to allow cam follower 1 to pass through a range of angular positions relative to supply housing 22, from a high dwell position 9 to a low dwell position 10. FIG. 3 shows the manner in which the lubricant transfer bushing 8 allows transfer of lubricant from lubricant supply bore 12 to cam follower lever arm transfer bore 16 through the full range of movement of cam follower lever arm 5 shown in FIG. 6. The cam follower lever arm 5 oscillates through a small angle 11 (generally less than 10°), thereby causing the lubricant transfer bushing 8 to move through an arc relative to the lubricant supply bore 12. In order to allow lubricant to pass between the stationary lubricant supply bore 12 and the lubricant transfer bushing 8 in all positions of the cam follower lever arm 5 between high dwell position 9 and a low dwell position 10, the axial bore 30 is sized and positioned so that it will always at least partially be in communication with lubricant supply bore 12. This configuration ensures that lubricant will be supplied to the cam follower bearing races 7 in any position of the cam follower lever arm 5. The overlap between the axial bore and the lubricant supply bore is not excessive, so that the lubricant supply bore 12 and the axial bore 30 are not exposed to the atmosphere to cause leaks.

Figure 5:
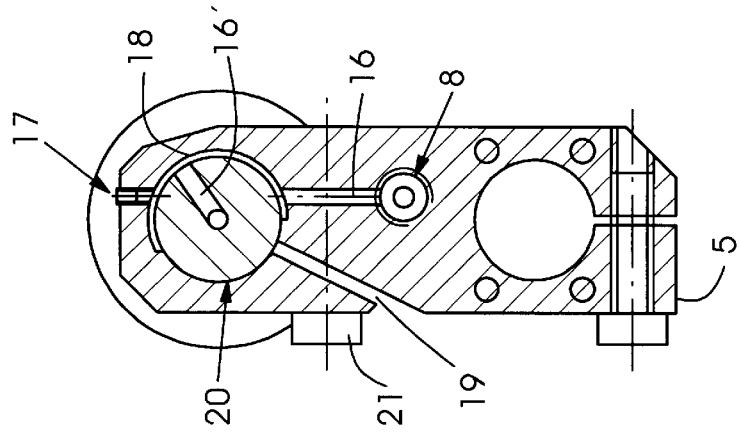
FIG. 5 is a cross-sectional view of the cam follower lever arm through line V—V in FIG. 4.

FIGS. 4 and 5 show details of the passages used to transfer lubricant to the inner bearing races 7 of the cam followers 1. As discussed above, lubricant passes through axial bore 30 and transverse bore 31 in lubricant transfer bushing 8 to cam follower lever arm transfer bore 16. Cam follower lever arm transfer bore 16 passes through axially (i.e., along the length of) the cam follower lever arm 5, where it connects with a partial cutout 18 which partially surrounds the circumferential surface of an eccentric stud 20 mounted in the cam followers lever arm 5. A plug 17, which may be in the form of a bolt or screw, may be used to close off an end of the cam follower lever arm transfer bore 16 at the end of cam follower lever arm 5.

Partial cutout 18 provides a lubricant transfer path between cam follower lever arm transfer bore 16 and an eccentric stud transfer bore 16', in a range of angular position of eccentric stud 20 relative to cam follower lever arm 5. As may be seen in FIG. 4, the eccentric stud transfer bore 16' splits into two passages passing axially through the eccentric stud 20, to thereby feed lubricant to the inner bearing races 7 of both cam followers 1. Plugs 17', which may be in the form of bolts or screws, may be used to close off the ends oft eccentric stud transfer bore 16' at either end of the eccentric 20 feed lubricant from eccentric stud transfer bore 16' to inner baring races 7.

Cam follower lever arm 5 includes an angled "sawcut" slot 19 extending from an outer surface of cam follower lever arm 5 to the bore which holds eccentric stud 20. This slot 19 allows the eccentric stud 20 to be adjusted angularly relative to the cam follower lever arm 5, thereby allowing adjustment of the cam followers 1 relative to the cam follower lever arm 5. A machine screw 21 may be loosened to allow adjustment of the eccentric stud 20 in the cam follower lever arm 5, and thereafter machine screw 21 may be tightened to lock the eccentric stud 20 in place. The circumferential extent of the partial cutout 18 ensures that the eccentric stud 20 may be adjusted in a range of approximately 180° relative to the cam follower lever arm 5 without interruption of communication between the cam follower lever arm transfer bore 16 and the eccentric stud transfer bore 16'. As a result, the free flow of lubricant is ensured in all positions of the eccentric stud 20 relative to the cam follower lever arm 5.

In the above description of the invention, those skilled in the art will perceive improvements, changes and modifications. For example, the present invention is not limited for use in a high-speed combination folder, and in fact could be used in any application in which it is necessary to ensure transfer of a lubricant or other fluid between two relatively moving parts. Improvements, changes and modifications within the skill of the art are intended to be covered by the claims.

What is claimed is:

1. A cylinder for a high speed combination folder including:

at least one gripper shaft;

at least one bearing support housing which is mounted around the gripper shaft; the bearing support housing including a lubricant supply bore;

a surface;

an arm including a first lubricant transfer bore, the arm being movable relative to the bearing support housing through a range of motion; and a lubricant transfer bushing, the lubricant transfer bushing including a lubricant passage, the lubricant transfer bushing biased against the surface to provide a substantially fluid tight seal, the lubricant passage being in communication with the lubricant supply bore and the lubricant transfer bore through the entire range of motion;

a spring which biases the lubricant transfer bushing against the surface, to thereby account for wear of the lubricant transfer bushing against the surface a set screw which adjusts a position of the lubricant transfer bushing relative to the surface.

2. The lubricant transfer apparatus of claim 1, wherein:

the lubricant transfer bushing is made of a low friction, high wear resistance material.

3. The lubricant transfer apparatus of claim 1, wherein:

the surface is located on the bearing support housing.

4. The lubricant transfer apparatus of claim 3, wherein:

the lubricant transfer bushing is mounted in the arm.

5. The lubricant transfer apparatus of claim 1, wherein:

the arm is a cam follower lever arm which includes at least one cam follower.

6. The lubricant transfer apparatus of claim 5, wherein:

the at least one cam follower is rotatably mounted on an eccentric stud, the eccentric stud being mounted on the cam follower lever arm.

7. The lubricant transfer apparatus of claim 6, wherein:

the at least one cam follower is mounted on the eccentric stud by a bearing.

8. The lubricant transfer apparatus of claim 6, wherein:

the eccentric stud includes at least one second lubricant transfer bore, the at least one second lubricant transfer bore being in communication with the first lubricant transfer bore.

9. The lubricant transfer apparatus of claim 8 further comprising:

a cutout between the at least one second lubricant transfer bore and the first lubricant transfer bore, the cutout providing communication between the at least one second lubricant transfer bore and the first lubricant transfer bore in different angular positions of the eccentric stud.

* * * * *